United States Patent
Narendran et al.

(12)

(10) Patent No.: US 11,006,470 B1
(45) Date of Patent: May 11, 2021

(54) CONTROLLING USE OF CARRIER AS SECONDARY CARRIER FOR CARRIER-AGGREGATION SERVICE

(71) Applicant: Sprint Spectrum L.P., Overland Park, KS (US)

(72) Inventors: Rajveen Narendran, Olathe, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 117 days.

(21) Appl. No.: 16/113,605

(22) Filed: Aug. 27, 2018

(51) Int. Cl.
| | |
|---|---|
| *H04W 76/15* | (2018.01) |
| *H04B 17/345* | (2015.01) |
| *H04B 17/373* | (2015.01) |
| *H04W 24/10* | (2009.01) |
| *H04W 88/08* | (2009.01) |

(52) U.S. Cl.
CPC .......... *H04W 76/15* (2018.02); *H04B 17/345* (2015.01); *H04B 17/373* (2015.01); *H04W 24/10* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2014/0301372 | A1* | 10/2014 | Fukuta | H04W 16/32 370/332 |
| 2015/0117404 | A1* | 4/2015 | Uchino | H04W 56/0045 370/331 |
| 2017/0188314 | A1* | 6/2017 | Mueck | H04W 24/02 |
| 2017/0202018 | A1* | 7/2017 | Cha | H04W 74/0816 |
| 2019/0082346 | A1* | 3/2019 | Tang | H04W 24/02 |

\* cited by examiner

*Primary Examiner* — Saba Tsegaye (57) ABSTRACT

A method and system for controlling carrier use to help manage uplink noise. A base station detects threshold high uplink noise on a carrier, and the base station responsively configures itself to prevent the carrier from being added as a secondary carrier for carrier-aggregation service, though the base station still allows establishment of new radio-link-layer connectivity encompassing the carrier as a primary serving carrier.

20 Claims, 4 Drawing Sheets

CONTROLLING USE OF CARRIER AS SECONDARY CARRIER FOR CARRIER-AGGREGATION SERVICE

BACKGROUND

A cellular wireless network typically includes a number of base stations that are configured to provide wireless coverage areas in which to serve user equipment devices (UEs) such as cell phones, tablet computers, tracking devices, embedded wireless modules, and other wirelessly equipped communication devices (whether or not user operated. In turn, each base station could be coupled with a core network that provides connectivity with one or more transport networks, such as the public switched telephone network (PSTN) and/or the Internet for instance. With this arrangement, a UE within coverage of the network could engage in air interface communication with a base station and could thereby communicate via the base station with various remote network entities or with other UEs served by the base station.

Such a network could operate in accordance with a particular radio access technology, with air-interface communications from the base stations to UEs defining a downlink or forward link and air-interface communications from the UEs to the base stations defining an uplink or reverse link.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with an example radio access technology, a base station could operate on one or more carriers, each of which could have a respective downlink frequency channel for carrying communications from the base station to UEs and a respective uplink frequency channel for carrying communications from the UEs to the base station. Each such carrier could be frequency division duplex (FDD), in which its downlink and uplink channels occupy separate respective ranges of frequency, each having an associated center frequency and bandwidth, or time division duplex (TDD), in which its downlink and uplink channels are time division multiplexed on a common range of frequency, having an associated center frequency and bandwidth.

Further, the downlink and uplink of each carrier could be structured to define various air interface resources and channels for carrying information between the base stations and UEs.

For example, the air interface could be divided over time into frames, with each frame being divided in turn into subframes or transmission time intervals (TTIs), and the carrier bandwidth could be divided over frequency into subcarriers, which could be grouped within each TTI to define physical resource blocks (PRBs) in which the subcarriers can be modulated to carry data. In each downlink TTI, a first time-portion of the air interface could define a downlink control region for carrying control signaling from the base station to served UEs, and a remaining time-portion of the air interface could define a physical downlink shared traffic channel on which the base station could allocate PRBs to carry data to served UEs. And in each uplink TTI, certain PRBs at the low-frequency and high-frequency ends of the uplink bandwidth could define an uplink control region for carrying control signaling from UEs to the base station, and a remainder of the PRBs across the uplink bandwidth could define a physical uplink shared traffic channel of which the base station could allocate PRBs to carry data from UEs to the base station. Further, certain air interface resource elements on the downlink and uplink could be reserved for other purposes as well.

When a UE is positioned within coverage of such a system, the UE could detect threshold strong coverage of a base station on a particular carrier. In turn, the UE and base station could then engage in control signaling to establish a radio-link-layer connection, defining an air interface connection through which the base station will then serve the UE. And the base station could establish for the UE a context record indicating an identity of the established radio-link-layer connection and noting that the connection encompasses the carrier on which the UE connected. Further, if the UE is not already registered for service with the core network, the UE could engage in attach signaling with the core network via the base station, and the core network could establish for the UE one or more bearer channels for carrying packet-data communications between the UE and a transport network such as the Internet.

The base station could then serve the UE on the carrier on which the UE connected, allocating PRBs as necessary to carry data over the air to and from the UE.

For instance, when the base station has data to transmit to a UE, the base station could assign certain PRBs in the downlink traffic channel of a given TTI for use to carry the data to the UE, and the base station could then transmit to the UE in that TTI a downlink control information (DCI) message that specifies the assigned PRBs and then encode and transmit the data to the UE in the assigned PRBs. Per the DCI message, the UE could then receive the transmitted data on the assigned PRBs.

Likewise, when the UE has data to transmit to the base station, the UE could transmit a scheduling request to the base station, the base station could then assign certain PRBs in an uplink traffic channel of a given TTI for use to carry the data from the UE and could transmit to the UE, in advance of that TTI, a DCI message that specifies the assigned PRBs. And the UE could accordingly encode and transmit the data to the base station in the assigned PRBs in that TTI.

Further, when served by the base station on such a carrier, the UE may regularly monitor air-interface channel quality and provide the base station with channel-quality reports. And the base station may use these channel-quality reports as a basis to set a modulation and coding scheme for downlink and uplink communications between the base station and the UE, which the base station may indicate in its DCI messages to the UE.

OVERVIEW

With such an arrangement, the bandwidth of the carrier on which the base station serves a UE may pose an effective limit on the peak rate of data communication between the base station and the UE, as the bandwidth would define only a limited number of PRBs per slot, with data rate (e.g., coding rate) per resource block being further limited based on air interface conditions. By way of example, in accordance with the LTE standard, a TDD carrier may be up to 20 MHz wide. Depending on the TDD frame format (e.g., how many sub-frames per frame are used for downlink versus uplink) and other factors, such a carrier may accommodate a peak downlink data rate of only about 60 megabits per second (Mbps).

One way to help overcome this per-carrier data rate limitation is to have a base station serve a UE on multiple carriers at once, providing carrier-aggregation service. With carrier aggregation service, multiple carriers from either contiguous frequency bands or non-contiguous frequency bands are aggregated together as respective "component carriers" to increase the overall bandwidth available per slot by providing a greater extent of air interface resources in which the base station can schedule uplink and downlink communication. For instance, if a base station serves a UE on two 20 MHz TDD LTE carriers at once, the peak throughput may be about 120 Mbps. And if the base station serves a UE on three 20 MHz TDD LTE carriers at once, the peak throughput may be as high as 180 Mbps.

With carrier aggregation, one of the carriers on which the base station serves the UE is deemed a primary carrier, or primary component carrier (PCC), and each additional carrier is deemed a secondary carrier, or secondary component carrier (SCC). The PCC may be the carrier on which the UE initially connects with the base station and is thus the UE's primary serving carrier, used for carrying control signaling and scheduled data communications between the base station and the UE. Whereas, each SCC may operate to provide added bandwidth for carrying scheduled data communications between the base station and the UE.

When a base station serves a UE over a radio-link-layer connection that encompasses a primary carrier alone or in combination with one or more other carriers, the base station may determine for various reasons that it would be useful to add a secondary carrier to the UE's radio-link-layer connection. For instance, the base station may determine that the UE is engaging in or will engage in a type of communication that demands high data rate, and perhaps that there is heavy load on the carrier(s) currently encompassed by the UE's radio-link-layer connection.

In response, the base station may engage in a process to add a carrier to the UE's radio-link-layer connection for carrier-aggregation service (e.g., for transitioning from serving the UE on a single carrier to serving the UE on multiple carriers at once, or adding a carrier to existing carrier-aggregation service of the UE). For instance, based on downlink reference-signal measurements that the UE reports for one or more other carriers on which the base station is configured (e.g., licensed) to operate, the base station could identify a carrier on which the UE has sufficiently strong coverage and could add that carrier as a secondary carrier to the UE's radio-link-layer connection.

Under the RRC protocol, for example, the base station could engage in RRC connection-reconfiguration signaling with the UE to inform the UE that the carrier is added as a secondary carrier. And in response, the UE could set itself to be served on the combination of at least the UE's primary carrier and the added secondary carrier, so that the UE will be then provide regular channel-quality reports for each such carrier and will be prepared to engage in data communication scheduled on each such carrier. Further, the base station could update its context record for the UE to indicate that the base station is then serving the UE on the combination of those carriers and could accordingly provide the UE with carrier-aggregation service.

When a base station is serving a UE on any given carrier, whether as the UE's sole serving carrier or as a component carrier in a carrier-aggregation scenario, the base station's ability to receive and decode uplink communication from the UE may depend on the level of uplink noise (e.g., reverse noise rise) on the carrier. When the level uplink noise on the carrier is relatively low, the base station may be able to readily decode the UE's uplink communications. Whereas, when the level of uplink noise on the carrier is relatively high, the base station may have a difficult time decoding the UE's uplink communications.

One contributing factor here may be the number of UEs that the base station serves concurrently on the given carrier and particularly the number of UEs from which the base station has scheduled concurrent uplink communication in the same uplink TTI as the UE at issue. In general, as more UEs transmit concurrently on the carrier, the concurrent transmissions from those UEs (perhaps at their maximum allowed transmission power levels) may result in higher uplink noise on the carrier, and the base station may have more difficulty decoding uplink transmissions on the carrier from any individual UE.

The present disclosure provides a mechanism to help control the level of uplink noise on a carrier, in order to help improve the base station's ability to decode uplink communication on the carrier.

The disclosure stems from a realization that, when a carrier is available for use as a secondary carrier for carrier-aggregation service, the base station might add that carrier as a secondary carrier to multiple UEs' radio-link-layer connections. Further, at the same time, one or more other UEs may be connected with the base station on that carrier as their primary serving carrier. In combination, the base station may therefore end up scheduling uplink communication on the carrier from both the UEs having the carrier as their primary carrier and the UEs having the carrier as a secondary carrier. Yet as noted above, serving many UEs concurrently on the carrier could result in high uplink noise on the carrier, which could impact the base station's ability to successfully decode communications from any individual UE.

The disclosed mechanism helps to address this issue by dynamically preventing a carrier from being added as a secondary carrier for carrier-aggregation service but still allowing establishment of new radio-link-layer connectivity encompassing the carrier as a UE's primary serving carrier. Per the disclosure, when the base station detects a threshold high level of uplink noise on one of its carriers, the base station will continue to operate on that carrier so that UEs can still detect coverage of the base station on the carrier and could initially connect with the base station on the carrier, but the base station will configure itself to prevent addition of the carrier as a secondary component carrier for carrier-aggregation service.

To facilitate this, the base station could flag the carrier in its data records as being one that is not to be added as a secondary carrier for carrier-aggregation service, but the base station could continue to provide service on the carrier. As a result, UEs may continue to detect coverage of the base station on the carrier and establish radio-link-layer connectivity encompassing the carrier as their primary serving carrier as noted above, but the base station would not add the carrier as a secondary carrier to any existing radio-link-connection.

In practice, if the carrier at issue is already set as a UE's secondary carrier, this process may not impact that configuration. Alternatively, when the base station detects threshold high uplink noise on the carrier, the base station could additionally respond by removing the carrier from any UE's radio-link-layer connection where the carrier is a secondary carrier for carrier-aggregation service.

Further, the base station's configuration to prevent addition of the carrier as secondary carrier for carrier-aggregation service could be temporary. For instance, the base station could maintain that configuration for a defined time period and, upon expiration of that time period, could automatically revert to allow the carrier to be added as a secondary carrier for carrier-aggregation service. Alternatively, the base station could maintain the configuration for as long as the base station continues to observe threshold high uplink noise on the carrier, and once the base station determines that uplink noise on the carrier is no longer threshold high, the base station could revert to allow the carrier to be added as a secondary carrier for carrier-aggregation service.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, or otherwise modified. In addition, operations described as being performed by one or more entities could be implemented in various ways, such as by a processor executing instructions stored in non-transitory data storage, along with associated circuitry or other hardware, for instance.

Figure 1:
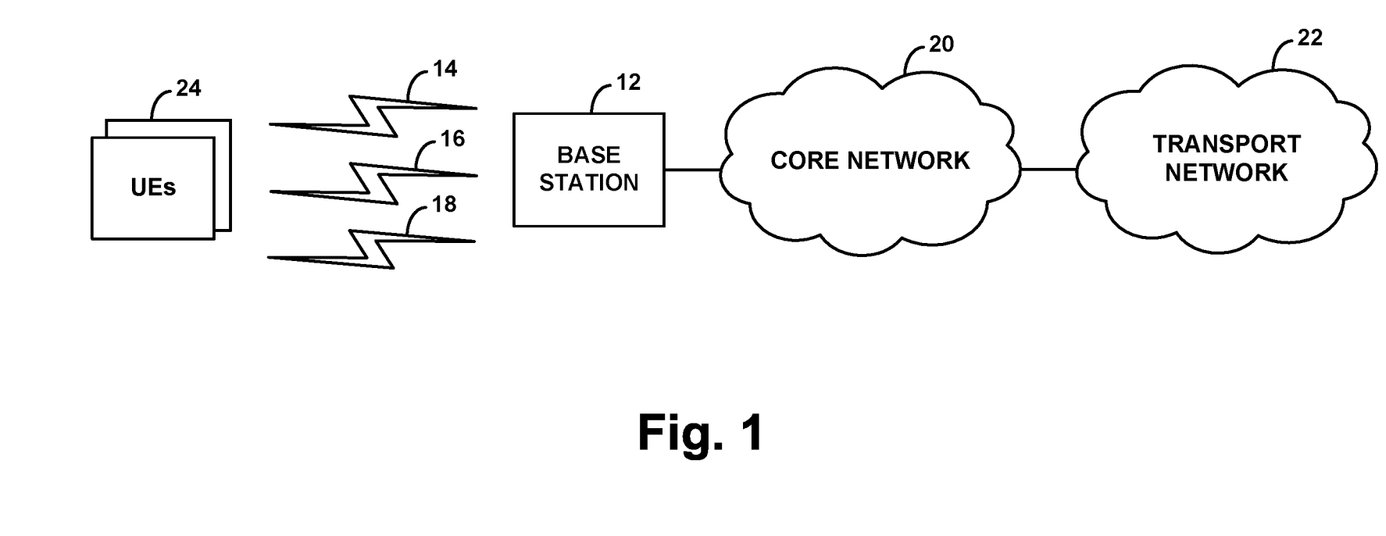
FIG. 1 is a simplified block diagram of an example wireless communication system in which disclosed features can be implemented.

As shown in FIG. 1, the example wireless communication system includes a representative base station (e.g., Node-B) 12 configured to operate on multiple carriers, of which several representative carriers 14, 16, 18 are shown. Base station 12 could be a macro base station of the type configured to provide a wide range of coverage, with one or more antenna structures mounted on a tower or other tall structure. Alternatively, the base station could take other forms, such as a small cell base station, a femtocell base station, or the like, configured to provide a smaller range of coverage.

Base station 12 is shown sitting as a node on a core network 20. For example, the base station could be coupled with an Enhanced Packet Core (EPC) network or other access network that includes components supporting an applicable radio access technology and provides connectivity with a transport network 22 such as the Internet for instance. Further, shown sitting within coverage of the base station 12 are multiple representative UEs 24, which could take any of the forms noted above by way of example.

In an example implementation, the base station is configured to operate on each of its carriers in accordance with an applicable radio access technology. For instance, on the downlink of each carrier, the base station may be configured to regularly broadcast a synchronization signal, a reference signal, and other overhead broadcast messages, to enable UEs to detect and evaluate the base station's coverage on the carrier. Further, the base station could be configured to engage in access signaling and radio-link-layer connection signaling on the carrier, to enable UEs to connect with the base station on the carrier. And the base station could be configured to coordinate air interface communication with UEs on which the base station serves on the carrier.

As discussed above, each of the base station's carriers could be TDD or FDD. Further, each carrier could have an uplink channel with a center frequency at a defined location in Radio Frequency (RF) spectrum and a bandwidth centered on that frequency. On each such carrier as discussed above, the air interface could define subframes or other transmission time intervals (TTIs) in which the uplink bandwidth is divided into PRBs. And as additionally discussed above, certain uplink PRBs could be generally reserved for uplink signaling, with the remainder being generally available for use as an uplink shared traffic channel.

As each of UEs 24 enters into coverage of base station 12, the UE may connect with the base station on one of the base station's carriers. For instance, the UE may scan for broadcast of a synchronization signal at a predefined center frequency, and upon finding such a signal, may then read a broadcast message to learn the bandwidth of the carrier and then evaluate strength of a reference signal broadcast throughout that bandwidth. If the UE thereby discovers coverage of sufficient strength on one such carrier, then the UE may connect with the base station on that carrier. Whereas, if the UE discovers coverage of sufficient strength on each of multiple carriers, then the UE may select the carrier with the strongest detected coverage and connect with the base station on the selected carrier.

Through this process, a numbers of UEs may connect with the base station respectively on each of the base station's carriers, and on each such carrier the base station may therefore concurrently serve multiple UEs at once. As the base station serves multiple UEs concurrently on a given carrier, the base station may allocate PRBs of that carrier in an effort to meet UE service needs. For instance, when the base station has data to transmit respectively to multiple different UEs in a given TTI, the base station could allocate the carrier's downlink PRBs among the UEs and could engage in the transmissions accordingly. Likewise, when multiple UEs have data to transmit respectively to the base station in a given TTI, the base station could allocate the carrier's uplink PRBs among the UEs and could schedule the transmissions to occur accordingly.

Further, as the base station serves any such UE, the base station may invoke or expand carrier-aggregation service for the UE. If the UE's radio-link-layer connection encompasses just one carrier, namely, a primary serving carrier on which the UE connected with the base station, the base station could invoke carrier-aggregation service for the UE, adding to the UE's radio-link-layer connection one or more other carriers as secondary carriers for the carrier-aggregation service. And if the UE's radio-link-layer connection already encompasses a primary carrier and one or more secondary carriers, the base station could expand carrier-aggregation service for the UE, adding to the UE's radio-link-layer connection one or more carriers as additional secondary carriers for the carrier-aggregation service.

To facilitate adding a secondary carrier to a UE's radio-link-layer connection, the base station could direct the UE to scan for coverage on other carriers as possible secondary carriers. And the UE could responsively work to discover coverage of other carriers and could report to the base station each discovered carrier of sufficient strength. Based on the UE's report, the base station could select a carrier and could add the selected carrier to the UE's radio-link-layer connection as a secondary carrier. In this process, as noted above, the base station could inform the UE that the carrier is added to the UE's radio-link-layer connection, and the base station could accordingly update its context record for the UE.

When a base station provides a UE with carrier-aggregation service, the base station could allocate PRBs to the UE across the UE's multiple component carriers. For example, the base station could schedule downlink transmission to the UE in a given TTI on some PRBs respectively of each carrier, and the base station could schedule uplink transmission to the UE in a given TTI on some PRBs respectively of each carrier.

Further, for any such carrier on which the base station is concurrently serving multiple UEs (perhaps with some UEs having the carrier as their primary (and perhaps only) serving carrier and with other UEs having the carrier as a secondary carrier for carrier-aggregation service), the base station could allocate PRBs of the carrier among the served UEs as discussed above.

As noted above, the present disclosure provides for controlling whether to allow a carrier to be added as a secondary carrier for carrier-aggregation service, based on a consideration of uplink noise on the carrier.

In a representative implementation, the base station could regularly monitor the level of uplink noise on each of the carriers on which the base station is configured to operate, and when the base station detects that the level of uplink noise on a given carrier is threshold high, the base station could then set a data record to indicate that the carrier should not be added as a secondary carrier to any existing radio-link-layer connection. But at the same time, the base station would continue to operate on the carrier and would still allow establishment of new radio-link-layer connectivity on the carrier.

The base station's monitoring of the level of uplink noise on a given carrier could involve the base station measuring uplink noise on the carrier as a whole. For instance, the base station could measure the level of energy present on each of the PRBs in the carrier's uplink traffic channel at times (e.g., in TTIs) when those PRBs are not scheduled to carry uplink data communication to the base station. Alternatively or additionally, the base station could measure the level of energy present on each PRB in the carrier's uplink traffic channel after subtracting from received signals on those PRBs any transmission scheduled to the base station. In practice, the measured level of uplink noise on the carrier could be an average or other statistical measure across the uplink bandwidth or the like.

Further, the base station's measurement of the level of uplink noise on the carrier could be a current measurement, leading to currently setting the carrier to not be added as a secondary carrier for carrier-aggregation service. Or the measurement could be one or more past measurements. For instance, the base station could track measured uplink noise level on the carrier at each of various times of day, over numerous days, and could establish a statistical measure representing a prediction of what the uplink noise level is likely to be at a given time of day—based on what the uplink noise level has been in the past at a similar time of day. At or approaching that time on a given day, the base station could then apply the prediction and responsively set itself to not allow addition of the carrier as a secondary carrier for carrier-aggregation service.

For each carrier on which the base station is configured to operate, the base station could store a respective data record (e.g., keyed to a carrier identifier) indicating whether the carrier can be added as a secondary carrier for carrier-aggregation service. Alternatively, the base station could maintain a blacklist indicating each carrier that should not be added as a secondary carrier for carrier-aggregation service. When the base station has detected that the level of uplink noise on a carrier is greater than a predefined noise threshold, such as a value in the range of 2 to 10 dB, for instance (possibly depending on factors, such as carrier load), the base station could then update these or other such data records accordingly to indicate that the carrier should not be added as a secondary carrier for carrier-aggregation service.

Such a data record could then control whether the base station will allow addition of a carrier as a secondary carrier for carrier-aggregation service as a general matter, i.e., for the base station's served UEs generally. When the base station is seeking to invoke or expand carrier-aggregation service for a UE, if a carrier is set to not be added as a secondary carrier, then the base station could exclude that carrier from being added as a secondary carrier.

For instance, if a UE reports that it detected sufficiently strong coverage of two secondary carriers, the base station might normally select the stronger of those two carriers to add to the UE's radio-link-layer connection as a secondary carrier. But if the base station has a record indicating that that carrier should not be added as a secondary carrier, as a result of the base station having detected threshold high uplink noise on the carrier, then the base station can forgo adding that carrier as a secondary carrier. Instead, the base station could select the second strongest carrier reported by the UE and could add that carrier to the UE's radio-link-layer connection as a secondary carrier.

Notably, however, even though the base station has flagged a carrier to not be added as a secondary carrier for carrier-aggregation service, the base station could continue to operate on that carrier and could allow establishment of new radio-link-layer connectivity encompassing the carrier as a primary carrier. For instance, the base station could continue to broadcast a synchronization signal, a reference signal, and other information on the carrier, so that UEs can still detect sufficiently strong coverage of the carrier and responsively engage in signaling to connect with the base station on the carrier.

Further, as noted above, the base station's setting of the carrier to not be added as a secondary carrier could be temporary. For instance, upon expiration of a predefined time period after setting the carrier to not be added as a secondary carrier, or if and when the base station detects that the level of uplink noise on the carrier is no longer threshold high, the base station can clear the setting or otherwise change its records to revert to allowing the carrier to be added as a secondary carrier.

Figure 2:
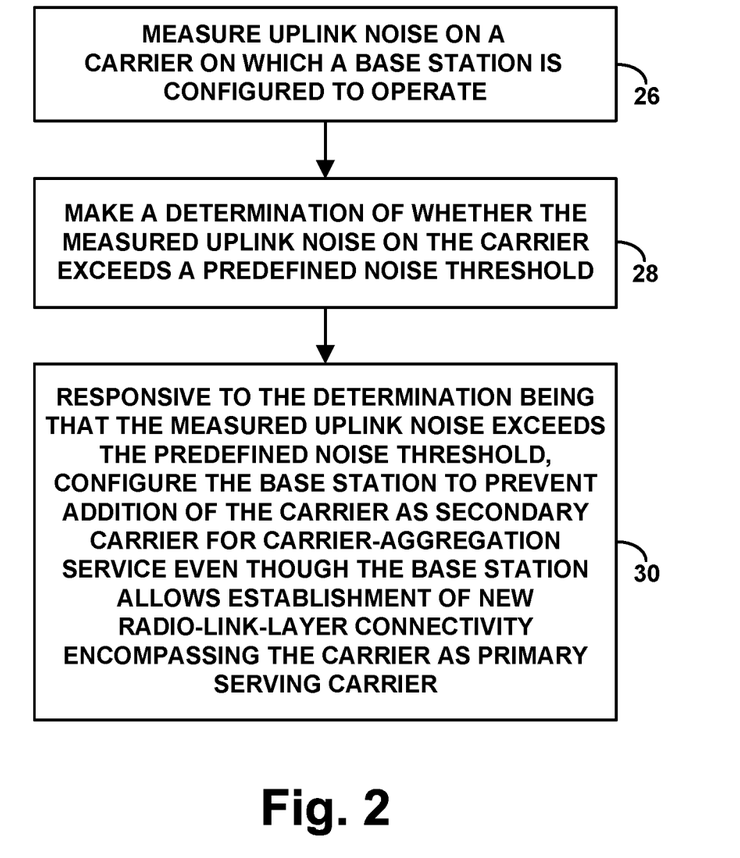
FIG. 2 is a flow chart depicting example operations in accordance with the disclosure.

FIG. 2 is a flow chart depicting a method that could be carried out in accordance with the present disclosure, to control carrier use in a scenario where a base station is configured to operate on a plurality of carriers.

As shown in FIG. 2, at block 26, the method includes the base station measuring uplink noise on a given carrier of the plurality. At block 28, the method further concludes the base station making a determination of whether the measured uplink noise on the given carrier exceeds (i.e., is greater than) a predefined noise threshold. And at block 30, the method includes, responsive to the determination being that the measured uplink noise exceeds the predefined noise threshold, the base station configuring itself to prevent addition of the given carrier as secondary carrier for carrier-aggregation service even though the base station allows establishment of new radio-link-layer connectivity encompassing the given carrier as primary serving carrier.

In line with the discussion above, the act of the base station configuring itself to prevent addition of the given carrier as secondary carrier for carrier aggregation service could involve the base station setting a data record to indicate that the given carrier should not be added as secondary carrier to any then or later existing radio-link-layer connection, in a scenario where the data record controls whether the base station will allow addition of the given carrier as secondary carrier for carrier-aggregation service.

After the base station so configures itself, the base station may be serving a UE over a radio-link-layer connection encompassing a primary serving carrier and not encompassing the given carrier, and while so serving the UE and considering invoking or expanding carrier-aggregation service for the UE, the base station may receive from the UE a report of the UE having detected threshold strong coverage on the given carrier.

Due to the data record indicating that the given carrier should not be added as secondary carrier to any existing radio-link-layer connection, however, the base station will forgo adding the given carrier as secondary carrier to the radio-link-layer connection over which the base station serves the UE. For instance, if the UE reported having detected threshold strong coverage on at least two carriers, including threshold strongest coverage on the given carrier, the base station could forgo adding the given carrier as secondary carrier to the UE's radio-link-layer connection by selecting from the at least two carriers a carrier other than the given carrier to add as secondary carrier to the UE's radio-link-layer connection, even though the UE reported the given carrier as threshold strongest of the at least two carriers.

As further discussed above, the act of the base station measuring uplink noise on the given carrier could involve the base station measuring energy that it receives on at least an uplink traffic channel of the given carrier at a time when uplink traffic is not scheduled on the carrier.

And as additionally discussed above, after the base station configures itself to not add the given carrier as secondary carrier for carrier-aggregation service, the base station could make another determination that the uplink noise on the given carrier no longer exceeds the predefined noise threshold. And responsive to that determination, the base station could then reconfigure itself to allow addition of the given carrier as secondary carrier for carrier-aggregation service. For instance, if the base station had set a controlling data record to indicate that the given carrier should not be added as secondary carrier to any existing radio-link-layer connection, the base station could then reverse the setting of the data record so as to then allow addition of the given carrier as secondary carrier when appropriate.

Figure 3:
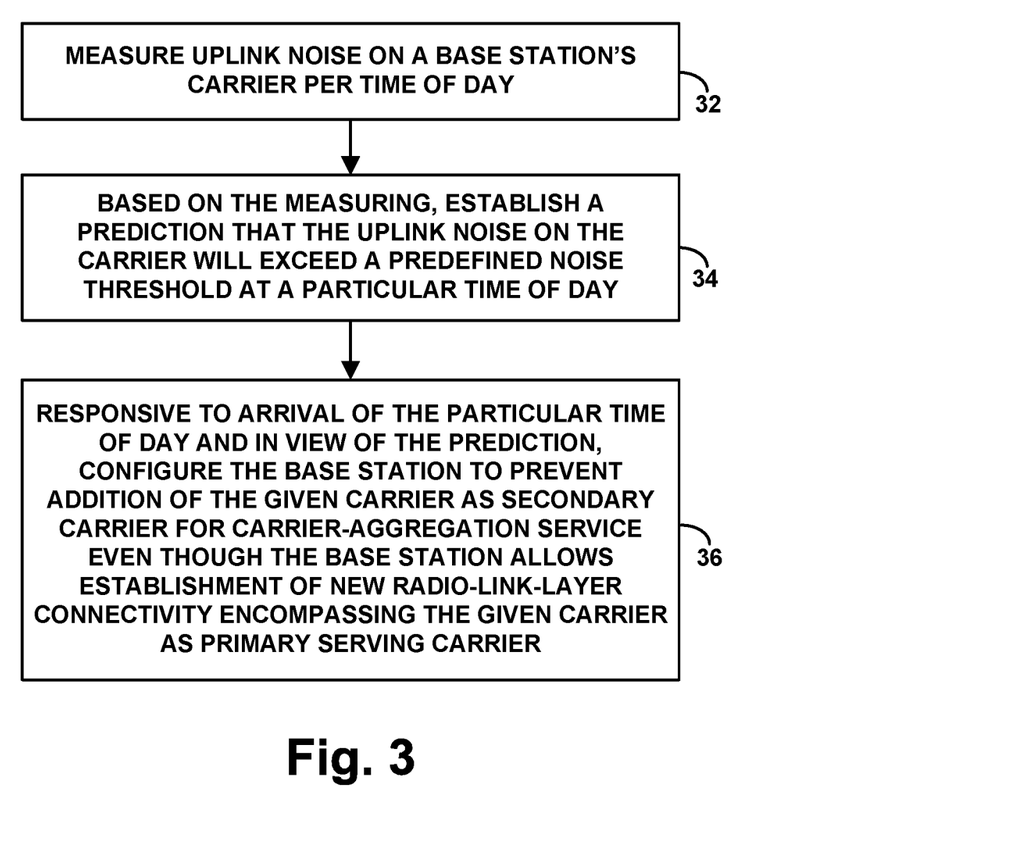
FIG. 3 is another flow chart depicting example operations in accordance with the disclosure.

FIG. 3 is next another flow chart depicting a method that could be carried out in accordance with the present disclosure, to control carrier use in a scenario where a base station is configured to operate on a plurality of carriers. In this implementation, as discussed above, the base station could track the level of uplink noise over time to support a prediction that the noise will be threshold high at a given time of day, and the base station could then apply that prediction as a basis to set the carrier to not be added as a secondary carrier for carrier aggregation service.

As shown in FIG. 3, at block 32, the method includes the base station measuring uplink noise on a given carrier per time of day. And at block 34, the method includes, based on the measuring, the base station establishing a prediction that the uplink noise on the given carrier will exceed a predefined noise threshold at a particular time of day. And at block 36, the method involves, responsive to arrival of the particular time of day and in view of the prediction, the base station configuring itself to prevent addition of the given carrier as secondary carrier for carrier-aggregation service even though the base station allows establishment of new radio-link-layer connectivity encompassing the given carrier as primary serving carrier.

Various features discussed above can be applied in the context of this method, and vice versa. For example, after the base station applies an established prediction that the uplink noise on the given carrier will be threshold high at a particular time of day and the base station therefore configures itself to not allow the given carrier to be added as secondary carrier for carrier-aggregation service, the base station could subsequently apply an established prediction that the uplink noise on the given carrier will not be threshold high at a later particular time of day and, at that later time, could therefore reconfigure itself to allow addition of the carrier as secondary carrier for carrier-aggregation service. Other examples are possible as well.

Figure 4:
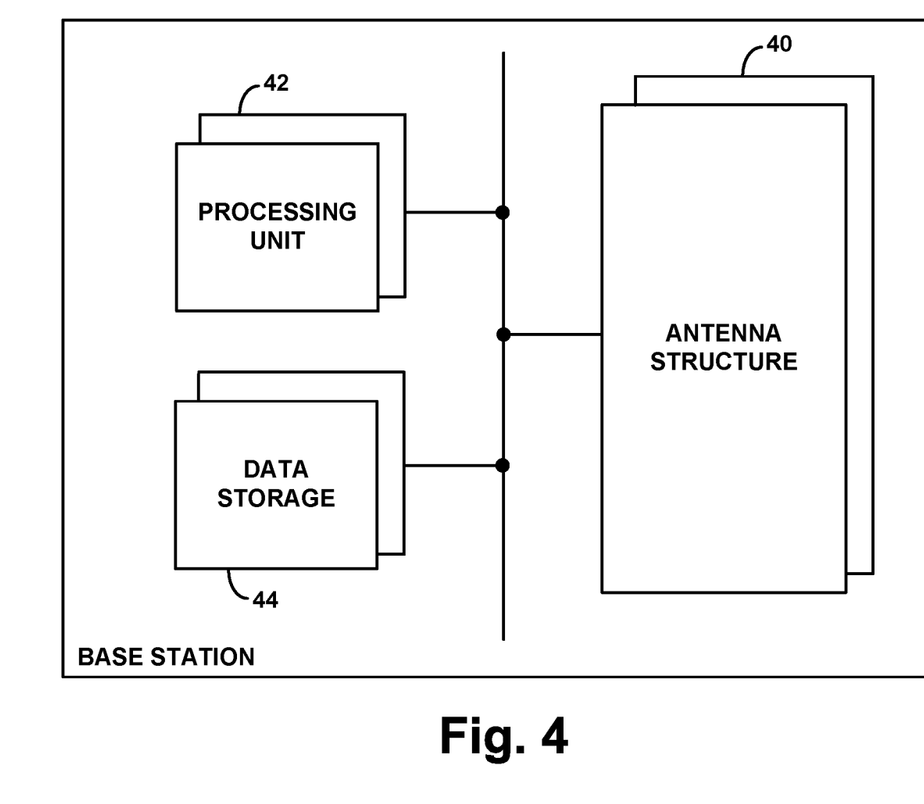
FIG. 4 is a simplified block diagram of an example base station operable in accordance with the disclosure.

Finally, FIG. 4 is a simplified block diagram of an example base station, showing some of the components that such a device could include in order to carry out these and other operations. As noted above, a representative base station could be a macro base station, a small cell, or other type of base station configured to operate on a plurality of carriers. As shown, the example base station includes at least one antenna structure 40, at least one processing unit 42, and at least one non-transitory data storage unit (computer-readable medium) 44.

In an example implementation, the at least one antenna structure 40 could comprise one or more antenna arrays (e.g., multiple-input-multiple-output (MIMO) antenna arrays, such as massive-MIMO arrays) or other antennas through which the base station is configured to engage in wireless air interface communication with UEs in accordance with a defined radio access technology.

Further, the at least one processing unit 42 could comprise one or more general purpose processors (e.g., microprocessors) and/or one or more specialized processors. And the at least one non-transitory data storage 44 could comprise one or more volatile and/or non-volatile storage components, such as magnetic, optical, flash, or other components.

As shown, the non-transitory data storage 44 stores or is encoded with program instructions (e.g., machine language instructions) 46. In an example implementation, these instructions are executable by the at least one processing unit 42 to cause the base station to carry out various operations described herein. For example, these operations could include measuring uplink noise on a given carrier of the base station's plurality of carriers. Further, the operations could include making a determination, based on the measuring, of whether the uplink noise on the given carrier exceeds a predefined noise threshold. And the operations could include, responsive to the determination being that the uplink noise on the given carrier exceeds the predefined noise threshold, configuring the base station to prevent addition of the given carrier as secondary carrier for carrier-aggregation service even though the base station allows establishment of new radio-link-layer connectivity encompassing the given carrier as primary serving carrier.

Various features discussed above can be applied in the context of this method, and vice versa. For instance, the measuring of uplink noise on the given carrier could be done over time, and the act of making the determination that the measured uplink noise on the given carrier exceeds the predefined noise threshold could involve (i) based on the measuring over time, establishing a prediction that the uplink noise on the given carrier will exceed a predefined noise threshold at a particular time of day, and (ii) responsive to arrival of the particular time of day, determining based on the prediction that uplink noise on the given carrier exceeds the predefined noise threshold. Other examples are possible as well.

Exemplary embodiments have been described above. Those skilled in the art will understand, however, that changes and modifications may be made to these embodiments without departing from the true scope and spirit of the invention.

What is claimed is:

1. A method for controlling carrier use, wherein a base station is configured to operate on a plurality of carriers, the method comprising:
   measuring by the base station uplink noise on a given carrier of the plurality of carriers, wherein measuring by the base station the uplink noise on the given carrier comprises measuring by the base station energy that the base station receives on the given carrier;
   making a determination by the base station of whether the measured uplink noise on the given carrier exceeds a predefined noise threshold; and
   responsive to the determination being that the measured uplink noise exceeds the predefined noise threshold, the base station configuring itself to prevent addition of the given carrier as secondary carrier for carrier-aggregation service even though the base station allows establishment of new radio-link-layer connectivity encompassing the given carrier as primary serving carrier.

2. The method of claim 1, wherein the base station configuring itself to prevent addition of the given carrier as secondary carrier for carrier aggregation service comprises the base station setting a data record to indicate that the given carrier should not be added as secondary carrier to any existing radio-link-layer connection, wherein the data record controls whether the base station will allow addition of the given carrier as secondary carrier for carrier-aggregation service.

3. The method of claim 2, further comprising:
   after the configuring, (i) serving by the base station a user equipment device (UE) over a radio-link-layer connection encompassing a primary serving carrier and not the given carrier, (ii) during the serving, receiving by the base station from the UE a report of the UE having detected threshold strong coverage on the given carrier, and (iii) due to the data record indicating that the given carrier should not be added as secondary carrier to any existing radio-link-layer connection, the base station forgoing adding the given carrier as secondary carrier to the radio-link-layer connection over which the base station serves the UE.

4. The method of claim 3,
   wherein receiving by the base station from the UE the report of the UE having detected threshold strong coverage on the given carrier comprises receiving by the base station from the UE a report of the UE having detected threshold strong coverage on each of at least two carriers, including threshold strongest coverage on the given carrier, and
   wherein forgoing adding the given carrier as secondary carrier to the radio-link-layer connection over which the base station serves the UE comprises selecting from the at least two carriers a carrier other than the given carrier to add as secondary carrier to the radio-link-layer connection on which the base station serves the UE, even though the UE reported the given carrier as threshold strongest of the at least two carriers.

5. The method of claim 1, wherein measuring uplink noise on the given carrier comprises measuring energy received by the base station on at least an uplink traffic channel of the given carrier at a time when uplink traffic is not scheduled on the carrier.

6. The method of claim 1, wherein the determination is a first determination, the method further comprising:
   after configuring itself to prevent addition of the given carrier as secondary carrier for carrier-aggregation service, making a second determination by the base station that the uplink noise on the given carrier no longer exceeds the predefined noise threshold; and
   responsive to the second determination being that the uplink noise on the given carrier no longer exceeds the predefined noise threshold, the base station reconfiguring itself to allow addition of the given carrier as secondary carrier for carrier-aggregation service.

7. The method of claim 6,
   wherein the base station configuring itself to prevent addition of the given carrier as secondary carrier for carrier aggregation service comprises the base station setting a data record to indicate that the given carrier should not be added as secondary carrier to any existing radio-link-layer connection, wherein the data record controls whether the base station will allow addition of the given carrier as secondary carrier for carrier-aggregation service, and
   wherein the base station reconfiguring itself to allow addition of the given carrier as secondary carrier for carrier-aggregation service comprises the base station reversing the setting of the data record.

8. A method for controlling carrier use, wherein a base station is configured to operate on a plurality of carriers, the method comprising:
   measuring by the base station uplink noise on a given carrier per time of day, wherein measuring by the base station the uplink noise on the given carrier comprises measuring by the base station energy that the base station receives on the given carrier;
   based on the measuring, establishing by the base station a prediction that the uplink noise on the given carrier will exceed a predefined noise threshold at a particular time of day; and
   responsive to arrival of the particular time of day and in view of the prediction, the base station configuring itself to prevent addition of the given carrier as secondary carrier for carrier-aggregation service even though the base station allows establishment of new radio-link-layer connectivity encompassing the given carrier as primary serving carrier.

9. The method of claim 8, wherein the base station configuring itself to prevent addition of the given carrier as secondary carrier for carrier aggregation service comprises the base station setting a data record to indicate that the given carrier should not be added as secondary carrier to any existing radio-link-layer connection, wherein the data record controls whether the base station will allow addition of the given carrier as secondary carrier for carrier-aggregation service.

10. The method of claim 8, further comprising:
after the configuring, (i) serving by the base station a user equipment device (UE) over a radio-link-layer connection encompassing a primary serving carrier and not the given carrier, (ii) during the serving, receiving by the base station from the UE a report of the UE having detected threshold strong coverage on the given carrier, and (iii) due to the data record indicating that the given carrier should not be added as secondary carrier to any existing radio-link-layer connection, the base station forgoing adding the given carrier as secondary carrier to the radio-link-layer connection over which the base station serves the UE.

11. The method of claim 10,
wherein receiving by the base station from the UE the report of the UE having detected threshold strong coverage on the given carrier comprises receiving by the base station from the UE a report of the UE having detected threshold strong coverage on each of at least two carriers, including threshold strongest coverage on the given carrier, and
wherein forgoing adding the given carrier as secondary carrier to the radio-link-layer connection over which the base station serves the UE comprises selecting from the at least two carriers a carrier other than the given carrier to add as secondary carrier to the radio-link-layer connection on which the base station serves the UE, even though the UE reported the given carrier as threshold strongest of the at least two carriers.

12. The method of claim 8, wherein measuring uplink noise on the given carrier comprises measuring energy received by the base station on at least an uplink traffic channel of the given carrier at a time when uplink traffic is not scheduled on the carrier.

13. The method of claim 8, wherein the particular time of day is a first particular time of day, wherein the prediction is a first prediction, the method further comprising:
based on the measuring, establishing by the base station a second prediction that the uplink noise on the given carrier will not exceed the predefined noise threshold at a second particular time of day; and
responsive to arrival of the second particular time of day and in view of the second prediction, the base station reconfiguring itself to allow addition of the given carrier as secondary carrier for carrier-aggregation service.

14. The method of claim 13,
wherein the base station configuring itself to prevent addition of the given carrier as secondary carrier for carrier aggregation service comprises the base station setting a data record to indicate that the given carrier should not be added as secondary carrier to any existing radio-link-layer connection, wherein the data record controls whether the base station allows addition of the given carrier as secondary carrier for carrier-aggregation service, and
wherein the base station reconfiguring itself to allow addition of the given carrier as secondary carrier for carrier-aggregation service comprises the base station reversing the setting of the data record.

15. A base station configured to control carrier use, wherein the base station is configured to operate on a plurality of carriers, the base station comprising:
at least one antenna structure through which the base station is configured to engage in wireless air interface communication with user equipment devices (UEs);
at least one processing unit; and
at least one non-transitory data storage encoded with instructions executable by the processing unit to cause the base station to carry out operations including:
measuring uplink noise on a given carrier of the plurality of carriers, wherein measuring the uplink noise on the given carrier comprises measuring energy that the base station receives on the given carrier,
based on the measuring, making a determination of whether the uplink noise on the given carrier exceeds a predefined noise threshold, and
responsive to the determination being that the uplink noise on the given carrier exceeds the predefined noise threshold, configuring the base station to prevent addition of the given carrier as secondary carrier for carrier-aggregation service even though the base station allows establishment of new radio-link-layer connectivity encompassing the given carrier as primary serving carrier.

16. The base station of claim 15, wherein the measuring is done over time, and wherein making the determination that the measured uplink noise on the given carrier exceeds the predefined noise threshold comprises:
based on the measuring over time, establishing a prediction that the uplink noise on the given carrier will exceed a predefined noise threshold at a particular time of day; and
responsive to arrival of the particular time of day, determining based on the prediction that uplink noise on the given carrier exceeds the predefined noise threshold.

17. The base station of claim 15, wherein configuring the base station to prevent addition of the given carrier as secondary carrier for carrier aggregation service comprises the setting a data record to indicate that the given carrier should not be added as secondary carrier to any existing radio-link-layer connection, wherein the data record controls whether the base station will allow addition of the given carrier as secondary carrier for carrier-aggregation service.

18. The base station of claim 15, wherein measuring uplink noise on the given carrier comprises measuring energy received by the base station on at least an uplink traffic channel of the given carrier at a time when uplink traffic is not scheduled on the carrier.

19. The base station of claim 15, wherein the determination is a first determination, the operations further comprising:
after configuring the base station to prevent addition of the given carrier as secondary carrier for carrier-aggregation service, making a second determination that the uplink noise on the given carrier no longer exceeds the predefined noise threshold; and
responsive to the second determination being that the uplink noise on the given carrier no longer exceeds the predefined noise threshold, the base station reconfiguring itself to allow addition of the given carrier as secondary carrier for carrier-aggregation service.

20. The base station of claim 19,
wherein configuring the base station to prevent addition of the given carrier as secondary carrier for carrier aggregation service comprises setting a data record to indicate that the given carrier should not be added as secondary carrier to any existing radio-link-layer connection, wherein the data record controls whether the base station will allow addition of the given carrier as secondary carrier for carrier-aggregation service, and
wherein reconfiguring the base station to allow addition of the given carrier as secondary carrier for carrier-aggregation service comprises reversing the setting of the data record.

* * * * *